Mar. 3, 1925.
W. A. DIEDERICK
TESTING PLUG
Filed Oct. 6, 1921
1,528,185
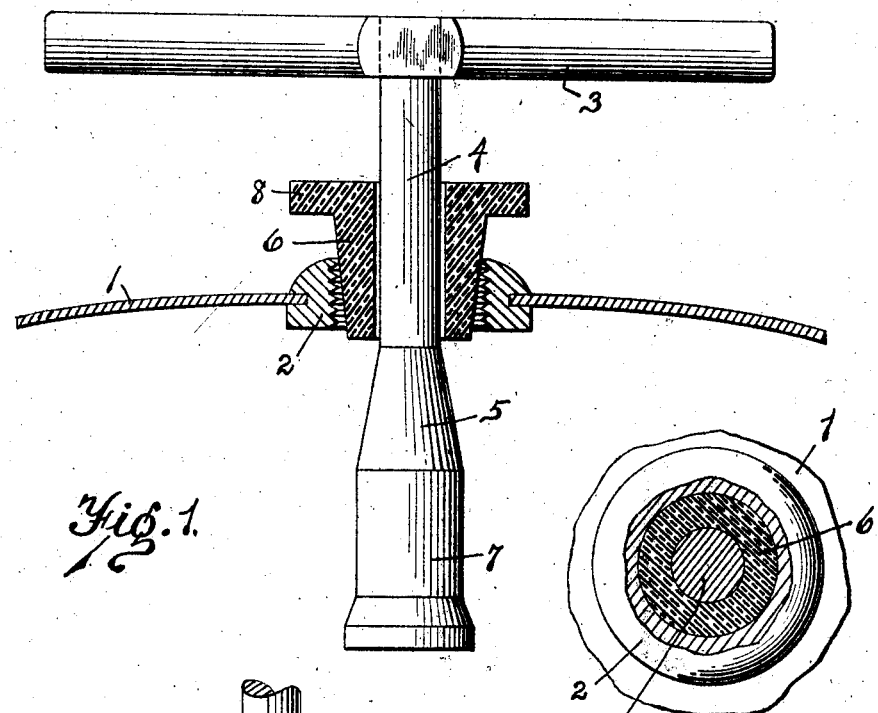
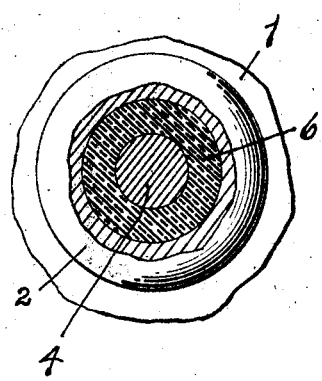
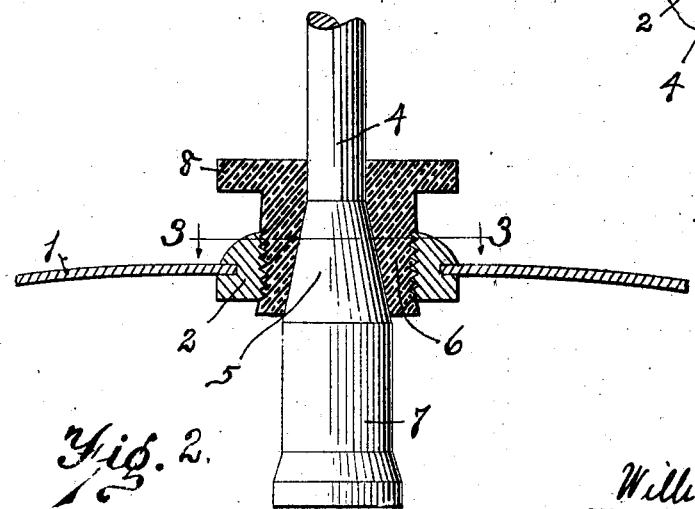
INVENTOR.
William A. Diederick
BY Edward N. Pagelsen,
ATTORNEY.

Patented Mar. 3, 1925.

1,528,185

UNITED STATES PATENT OFFICE.

WILLIAM A. DIEDERICK, OF DETROIT, MICHIGAN, ASSIGNOR TO DETROIT RANGE BOILER AND STEEL BARREL COMPANY, OF DETROIT, MICHIGAN, A CORPORATION OF MAINE.

TESTING PLUG.

Application filed October 6, 1921. Serial No. 505,760.

*To all whom it may concern:*

Be it known that I, WILLIAM A. DIEDERICK, a citizen of the United States, and residing at Detroit, in the county of Wayne and State of Michigan, have invented a new and Improved Testing Plug, of which the following is a specification.

This invention relates to means for temporarily closing tapped or bushed holes and other small openings in containers such as boilers, tanks and casks which are to be tested to determine whether they are water tight, and its object is to provide a self-adjusting closure for such openings which can be quickly inserted, which will adapt itself to openings varying considerably in size, and which can be produced at relatively low cost.

This invention consists, in combination with a tapering shank, of a flexible plug mounted on the shank and adapted to be expanded thereby to fit the opening which is to be closed.

It further consists in the details of construction illustrated in the accompanying drawing and particularly pointed out in the claim.

In the drawing, Fig. 1 is an elevation of the tapering shank and the handle thereon and a longitudinal section of the expansible bushing which together constitute this improved testing plug. Fig. 2 is a similar view showing the bushing expanded in the opening to be sealed. Fig. 3 is a section on the line 3—3 of Fig. 2.

Similar reference characters refer to like parts throughout the several views.

The drawing shows the wall 1 of a container which may be of any desired construction and a tapped ring 2 fitted therein. The handle 3 of the testing plug is removably attached to the reduced portion of a shank 4 whose tapering portion 5 is adapted to be forced into an expansible bushing 6 of flexible resilient material such as rubber. When this plug is to be used to close an opening in a container, the expansible bushing 6 is slipped up onto the reduced portion of the shank 4 and the large end 7 of the shank is inserted through the ring 2, after which the expansible bushing 6 is pushed down into the opening to be sealed. Thereafter the shank is pulled out until the tapering portion 5 has expanded the flexible bushing 6, as shown in Fig. 2, forcing the material thereof to fit the threads, if any, of this ring 2.

When pressure is applied to the interior of the receptacle 1, the pressure on the end 6 of this shank will hold the tapering portion 5 in the position shown in Fig. 2, and any increase in pressure will tend to still more expand the flexible bushing within the ring 2, thus preventing leakage. I have found that this device absolutely seals an opening in a threaded ring, such as the ring 2 in the drawing, and under normal conditions also rigidly holds the bushing 6 in position where the interior wall of the opening is comparatively smooth. The flange 8 at the outer end of the bushing prevents it from slipping through the holes to be plugged.

After the pressure within the container is released, the shank 4 may be pushed inward to the position shown in Fig. 1 to permit the bushing 6 to contract, after which this bushing and the stem may be removed. The time required for positioning this testing plug is so short and its cost is so low that it has proven itself to be a very desirable device.

The sizes and proportions as well as the details of construction of this testing plug may be changed by those skilled in the art without departing from the spirit of my invention as set forth in the following claim.

I claim:—

A closure for openings in containers comprising a tapped ring secured in the opening, a rubber bushing which is normally of less diameter than the threaded opening in said ring and which is adapted to be expanded to engage the threads of said ring, and a shank slidable in said bushing and formed with a conical wedge adapted to expand the bushing when forced into it.

WILLIAM A. DIEDERICK.